United States Patent
Oh

(10) Patent No.: US 11,348,312 B2
(45) Date of Patent: *May 31, 2022

(54) METHOD OF GENERATING TRANSFERRED PATTERN OF GARMENT DRAPED ON AVATAR

(71) Applicant: CLO Virtual Fashion Inc., Seoul (KR)

(72) Inventor: Seung Woo Oh, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,842

(22) Filed: Sep. 28, 2020

(65) Prior Publication Data

US 2021/0012569 A1 Jan. 14, 2021

Related U.S. Application Data

(63) Continuation of application No. 16/368,897, filed on Mar. 29, 2019, now Pat. No. 10,789,774.

(30) Foreign Application Priority Data

Mar. 30, 2018 (KR) .......................... 10-2018-0037753

(51) Int. Cl.
*G06T 17/20* (2006.01)
*G06T 13/40* (2011.01)

(52) U.S. Cl.
CPC .............. *G06T 17/20* (2013.01); *G06T 13/40* (2013.01); *G06T 2200/04* (2013.01)

(58) Field of Classification Search
None
See application file for complete search history.

(56) References Cited

U.S. PATENT DOCUMENTS

2013/0057544 A1* 3/2013 Oh .......................... G06T 19/00
345/419

FOREIGN PATENT DOCUMENTS

KR 10-2014-0108451 A 9/2014

OTHER PUBLICATIONS

Lee et al. "Automatic pose-independent 3D garment fitting", Computers & Graphics 37, pp. 911-922, 2013 (Year: 2013).*
Brouet et al. "Design Preserving Garment Transfer", ACM Transactions on Graphics, vol. 31, No. 4, Article 36, Jul. 2012 (Year: 2012).*
Brouet, R. et al., "Design Preserving Garment Transfer", ACM Transactions on Graphics, vol. 31, No. 4, Article 36, Jul. 2012, pp. 1-11.

(Continued)

*Primary Examiner* — Yingchun He
(74) *Attorney, Agent, or Firm* — Fenwick & West LLP

(57) ABSTRACT

Provided is a method of generating a transferred pattern of a garment draped on an avatar. Target patterns of a target garment are directly generated by deforming source patterns instead of flattening a model of the target garment. According to an aspect, target strain tensors representing deformations between meshes of the source patterns and corresponding meshes of the target garment are calculated from avatar deformation transformation values. Pattern strain tensors are calculated from the target strain tensors and source strain tensors, and target patterns are generated by multiplying the pattern strain tensors and the source patterns.

15 Claims, 6 Drawing Sheets

(56) References Cited

OTHER PUBLICATIONS

Lee, Y. et al., "Automatic pose-independent 3D garment fitting", Computers & Graphics 37, Aug. 2013, pp. 911-922.
Sumner, R. W. et al., "Deformation Transfer for Triangle Meshes", SIGGRAPH 2004, ACM Transactions in Graphics. 23, 3, Aug. 2004, pp. 1-7.
United States Office Action, U.S. Appl. No. 16/368,897, filed Apr. 9, 2020, nine pages.

\* cited by examiner

METHOD OF GENERATING TRANSFERRED PATTERN OF GARMENT DRAPED ON AVATAR

CROSS-REFERENCE TO RELATED APPLICATIONS

This application is a continuation of U.S. application Ser. No. 16/368,897 filed on Mar. 29, 2019, which claims priority to and the benefit of Korean Patent Application No. 10-2018-0037753, filed on Mar. 30, 2018, the disclosure of which are incorporated herein by reference in their entirety.

BACKGROUND

1. Field of the Invention

The present invention relates to a technology for draping a garment on an avatar through computer graphics, and more particularly, to a method of generating a transferred pattern of a garment draped on an avatar.

2. Discussion of Related Art

"Deformation transfer for triangle meshes," Association for Computing Machinery (ACM) Transactions on Graphics. 23, 3. August 2004 by Robert W. Sumner and Jovan Popovic discloses the basic concept of deformation transfer between graphic objects modeled with triangle meshes. The goal of deformation transfer is to transfer the change in shape exhibited by the source deformation onto the target. The degree of deformation of each mesh of the source object is represented by an affine transformation matrix. The affine transformation matrix encodes the change in orientation, scale, and skew induced by the deformation on the triangle. After this, a correspondence map is calculated by determining meshes of the target corresponding to respective meshes of the source. The correspondence map is generally m:n. Then, a corresponding affine transformation matrix is applied to each mesh of the target. An affine transformation matrix corresponding to each mesh of the target has been calculated from a mesh of the source corresponding to the mesh of the target. Subsequently, to maintain consistency between adjacent meshes, displacements which are optimized to minimize the total sum of energy due to the deformation while maintaining connections between target meshes are calculated for the respective target meshes. When the calculated displacements are each applied to the respective target meshes, a three-dimensional (3D) model to which deformation of the source has been transferred is obtained.

Here, the correspondence map is determined by finding triangle meshes whose barycenters are closest to those of source triangle meshes with the help of user-selected marker points. This requires human intervention to calculate target deformation.

Korean Unexamined Patent Publication No. 2014-0108451 filed by the present applicant and published on Sep. 11, 2014 discloses an automatic garment draping transfer method. According to this method, a garment is made like the skin of an avatar, and positions on the surface of the avatar closest to respective points of the garment are calculated so that connections are made between all the points of the garment and points on the surface of the avatar. Subsequently, the sizes and poses of avatars are made identical to each other through fitting between the avatars on the basis of feature points. After this, the garment of the fitted avatar is transferred to the target avatar as it is, and then collisions are removed. When the two avatars considerably differ in shape, many collisions occur, and thus it is difficult to transfer garment draping according to this method. Also, there is no description about automation of the process of mapping corresponding features between two avatars.

"Design Preserving Garment Transfer," ACM transactions on Graphics, 2012, 31 (4), Article No. 36 by Remi Brouet, Alla Sheffer, Laurence Boissieux, and Marie-Paule Cani presents a fully automated method for design-preserving transfer of garments between characters with different body shapes. This denotes automation of a process frequently referred to as "pattern grading" in garment design. According to this paper, pattern grading involves generating a skinning-like initial model of a proportionally scaled reference garment first. Subsequently, a global design preserving optimization is performed. The design preserving optimization includes a process of separately preserving fits of sensitive tight regions and other regions while maintaining normal vectors of respective triangle meshes as identical as possible in order to efficiently preserve a shape of a source garment. Additionally, two-dimensional (2D) patterns are extracted from the generated 3D garment model.

According to this technique, however, target patterns deformed for a transfer are generated by flattening a 3D target garment generated through deformation transfer. Therefore, due to degraded optimization accuracy, contour lines are irregular, and it is not possible to directly use the target patterns in an actual garment design.

In addition, the 2D patterns generated from the transferred 3D modeling result reflect the influence of gravity because 3D modelling includes the influence of gravity. When a 3D model is generated again from the generated 2D patterns, gravity is applied double, and thus the 3D model may have a different shape than a transferred 3D model.

SUMMARY OF THE INVENTION

The present invention is directed to providing a method of efficiently transforming source patterns draped on a source avatar into target patterns which may be draped on a new target avatar.

The present invention is also directed to achieving such a degree of completion of generated target patterns that the target patterns may be actually used.

The present invention is also directed to precluding the influence of gravity included in a three-dimensional (3D) model when target patterns are generated.

The present invention is also directed to generating garment patterns which may be effectively draped on a target avatar from garment patterns draped on a source avatar even when the source avatar and the target avatar significantly differ in shape.

According to an aspect of the present invention, target patterns of a target garment which may be draped on a target avatar is directly generated by deforming source patterns instead of flattening a model of the target garment.

According to the aspect of the present invention, mesh shapes of the target garment to be draped on the target avatar are calculated by applying the avatar deformation transformations of meshes of a source avatar surface to corresponding meshes of a source garment draped on a source avatar. Target deformations which represent deformations between meshes of the source patterns and corresponding meshes of the target garment are calculated from the mesh shapes of the target garment. Pattern deformations are calculated from the target deformations and source deformations, and the target patterns are generated from the pattern deformations and the source patterns.

According to the aspect of the present invention, an operation of smoothing distribution of pattern deformations may be further included to generate the target patterns.

According to the aspect of the present invention, an operation of calculating final pattern deformations optimized to minimize an objective function related to differences between the calculated pattern deformations and the final pattern deformations may be further included.

According to an additional aspect of the present invention, a constraint may be imposed so that points of meshes on a straight line may be maintained on a straight line after the optimization. According to an additional aspect of the present invention, a constraint may be imposed so that points of meshes on a curved line may be maintained at a curvature of the curved line after the optimization. According to an additional aspect of the present invention, a constraint may be imposed so that two segments of patterns to be connected by a sewing line may have the same length after the optimization. According to an additional aspect of the present invention, a constraint may be imposed so that pressure distribution of the source garment may be maintained as identical as possible after the optimization.

According to the aspect of the present invention, a correspondence map between the avatars is modeled using a virtual reference garment which is modeled with meshes whose plurality of vertices are connected to each other by springs and designed to closely adhere to a body surface. The correspondence map between the avatars may be calculated by handling meshes of the virtual reference garment draped on a three-dimensionally modeled avatar as meshes of the avatar.

According to the aspect of the present invention, avatar deformation transformations may be calculated by handling the meshes of the virtual reference garment draped on a three-dimensionally modeled avatar as meshes of the avatar.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The aforementioned and additional aspects of the present invention will become more apparent from embodiments which will be described with reference the accompanying drawings. A variety of combinations of components of the respective embodiments are possible unless described otherwise or contradicted by context.

The present invention is implemented by a graphic program executed in a computing device. The computing device includes a microprocessor and a memory for storing a program executed by the microprocessor and data. As used herein, "command set" may be commands included in one program module of a computer program, consecutive commands in a computer program, or commands which are inconsecutively present at some positions in a computer program but perform one unified function. Operations constituting a method implemented as a computer program may be implemented as one or more command sets.

Figure 1:
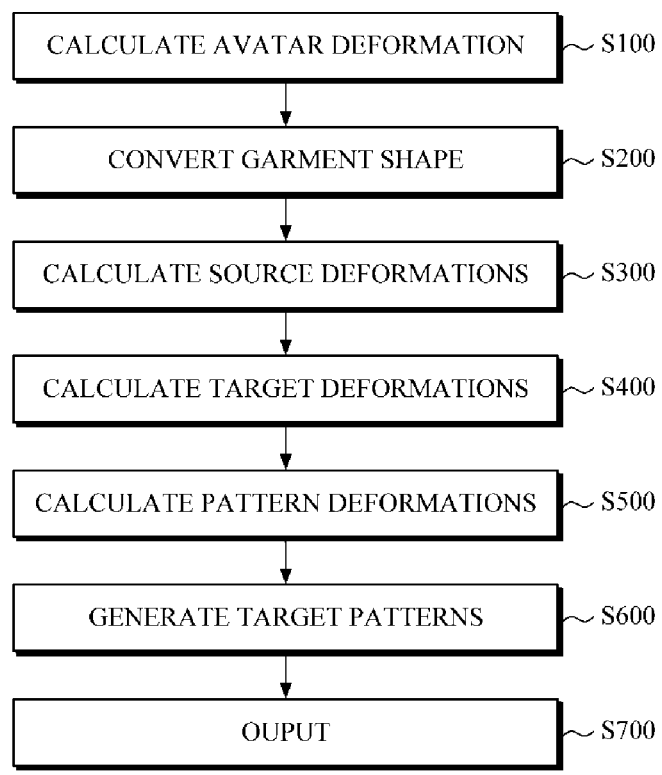
FIG. 1 is a flowchart illustrating a method of generating a transferred pattern of a garment draped on an avatar according to an exemplary embodiment of the present invention.

FIG. 1 is a flowchart illustrating a method of generating a transferred pattern of a garment draped on an avatar according to an exemplary embodiment of the present invention. As shown in the drawing, the method of generating a transferred pattern according to an exemplary embodiment includes an avatar deformation calculation operation S100, a garment shape conversion operation S200, a source deformation calculation operation S300, a target deformation calculation operation S400, a pattern deformation calculation operation S500, a target pattern generation operation S600, and an output operation S700.

In the avatar deformation calculation operation S100, deformation transformations between meshes of a source avatar surface and meshes of a target avatar surface are calculated. Subsequently, the shape of a target garment is calculated by applying the deformation transformations to a source garment (S200). In other words, mesh shapes of the target garment to be draped on the target avatar are calculated by applying avatar deformation transformations of corresponding meshes of the source avatar surface to meshes of the source garment draped on the source avatar.

When the surfaces of the source avatar and the target avatar are modeled with meshes, deformation transformations between the avatar meshes may be calculated using a correspondence map. The correspondence map may be proportionally calculated on the basis of feature points of the avatars, for example, the head ends, the tiptoes, and ends of the arms. The meshes of the source avatar surface corresponding to the meshes of the source garment may be determined by, for example, finding a vertex of an avatar mesh closest to a vertex of a mesh of the garment.

Figure 2:
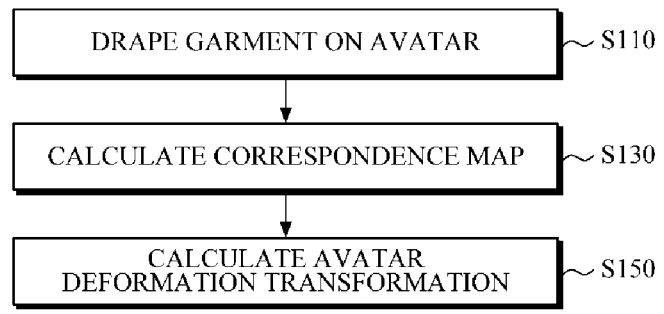
FIG. 2 is a flowchart illustrating an operation of calculating a correspondence map and avatar deformation transformations according to an exemplary embodiment of the present invention.

FIG. 2 is a flowchart illustrating an operation of calculating a correspondence map and avatar deformation transformations according to an exemplary embodiment of the present invention. According to an aspect, a virtual reference garment, which is modeled with meshes whose plurality of vertices are connected to each other by springs and is designed to closely adhere to a body surface, is prepared. In an exemplary embodiment, the meshes are triangles. In general, a virtual garment is modeled with meshes each having a mass and having vertices connected to each other by springs. On the other hand, a virtual reference garment is intended to generally model the surfaces of several avatars having various shapes and thus does not necessarily have a mass. However, it is unnecessary to preclude having a mass either.

In a process of draping a garment on an avatar, when a user appropriately dispose two-dimensional (2D) patterns on the avatar and commands that the 2D patterns be sewed along sewing lines, the 2D patterns are converted into a three-dimensional (3D) garment object through simulation. According to an exemplary embodiment of the present invention, after a user appropriately disposes 2D patterns of a virtual reference garment on a source avatar and converts the 2D patterns into a 3D garment object by commanding that the 2D patterns be sewed along sewing lines, a calculation result, that is, a virtual reference garment draped on the source avatar, is generated. Additionally, after the user appropriately disposes 2D patterns of the virtual reference garment on a target avatar and converts the 2D patterns into a 3D garment object by commanding that the 2D patterns be sewed along sewing lines, a calculation result, that is, a virtual reference garment draped on the target avatar, is generated (operation S110). In a correspondence map calculation operation S130, a correspondence map is calculated from the two virtual reference garments, that is, the virtual reference garment draped on the source avatar and the virtual reference garment draped on the target avatar. The correspondence map includes pairs of position information of meshes of the virtual reference garment draped on the source avatar and the corresponding meshes of the virtual reference garment draped on the target avatar. This correspondence map is stored in a memory. As an example, the position information of meshes may be position information of vertices of the meshes. As another example, the position information of meshes may be position information of the barycenters of the meshes. Therefore, even when an avatar surface is not modeled with meshes, for example, even when an avatar is modeled with polygons, it is possible to readily transfer garment draping.

According to another aspect, a correspondence map calculation process including a virtual reference garment draping process is automatically performed. This exemplary embodiment is described with reference to FIG. 2. According to this exemplary embodiment, to calculate a correspondence map, a virtual reference garment is draped on a source avatar first. When a user selects a source avatar, a program of the present invention recognizes feature points of the source avatar, for example, the head, the shoulder line, the arms, and the legs, through 3D object recognition and appropriately disposes 2D patterns of a virtual reference garment. Sewing line information is previously input into the 2D patterns of the virtual reference garment, and the disposed 3D patterns are connected by the sewing lines and then draped. When the virtual reference garment is draped and meshes of the virtual reference garment closely adhere to the source avatar surface, the source avatar surface is modeled.

The same virtual reference garment is also draped on a target avatar. Draping the two avatars may be processed concurrently or in any sequence. When the user selects a target avatar, the program of the present invention recognizes feature points of the target avatar, for example, the head, the shoulder line, the arms, and the legs, through 3D object recognition and appropriately disposes 2D patterns of the virtual reference garment. Sewing line information is previously input into the 2D patterns of the virtual reference garment, and the disposed 2D patterns are connected by the sewing lines and then draped. When the virtual reference garment is draped and meshes of the virtual reference garment closely adhere to the target avatar surface, the target avatar surface is modeled (operation S110).

Therefore, even when an avatar surface is not modeled with meshes, for example, even when an avatar is modeled with polygons, it is possible to readily transfer garment draping.

Subsequently, a correspondence map is calculated from pairs of position information of meshes of the virtual reference garment draped on the source avatar and corresponding meshes of the virtual reference garment draped on the target avatar (operation S130). Since the same virtual reference garment has been draped, it is possible to directly identify corresponding meshes.

As an example, the position information of meshes may be position information of vertices of the meshes. As another example, the position information of meshes may be position information of the barycenters of the meshes.

Figure 5:
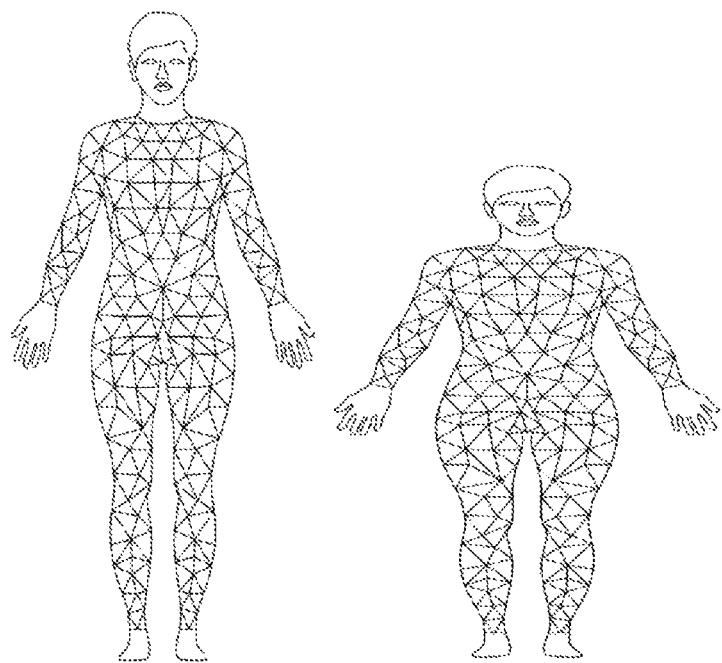
FIG. 5 shows a source avatar and a target avatar draped in a virtual reference garment.

FIG. 5 shows a source avatar and a target avatar draped in the virtual reference garment. Since the same virtual reference garment has been draped, connectivity and the number of meshes are the same in spite of different volumes and shapes of the two avatars. Meshes are shown for illustration and are not generally shown in actual simulation results.

In general, during a simulation, it is advantageous in terms of calculation reduction to determine the sizes of meshes of a virtual garment according to the delicacy of a movement differently depending on parts. In an exemplary embodiment of the present invention, however, meshes are only intended to model an avatar surface, and thus the sizes of all meshes may be identical. The virtual reference garment closely adheres to the surfaces of the source avatar and the target avatar. Therefore, when the virtual reference garment is visualized and output on a screen, the avatars look like they are having their underwear on.

This virtual reference garment is temporarily used to model an avatar surface and covers all avatar surfaces on which garments of various designs may be draped. In other words, the virtual reference garment is required to cover all areas of an avatar surface which may be covered by all kinds of garments, such as a skirt, short pants, pants, a t-shirt, and a dress.

Calculating a correspondence map between avatars with such a virtual reference garment may be extensively applied to animals as well as human bodies. As mentioned above in BACKGROUND, a correspondence map may be applied not only to draping transfer of a garment object but also to deformation transfer.

Next, avatar deformation is calculated (operation S150). Avatar deformation is defined as deformation transformations between meshes of the source avatar surface and corresponding meshes of the target avatar surface based on the correspondence map. The deformation transformations are frequently expressed as the sum of an affine transformation matrix and a displacement matrix. In another example, when a barycentric coordinate system is appropriately set up and converted, the deformation transformations may be expressed as only an affine transformation matrix. Variations of orientation, scale, and skew caused by a mesh deformation are encoded by an affine transformation. When the surface of the avatar is modeled with meshes, it is possible to map meshes of the surface of the source avatar to meshes of the surface of the target avatar using the correspondence map.

According to another aspect, avatar deformation may be calculated as deformation transformations between meshes of the virtual reference garment draped on the source avatar and corresponding meshes of the virtual reference garment draped on the target avatar surface. In this case, meshes of the virtual reference garment closely adhering to an avatar surface are considered as modeling the surface of the avatar.

Referring back to FIG. 1, after avatar deformation is calculated, the shape of a transferred garment is determined (S200). Mesh shapes of the target garment to be draped on the target avatar are calculated by applying avatar deformation transformations of corresponding meshes of the source avatar surface to meshes of the source garment draped on the source avatar. A deformation transformation may be an affine transformation matrix, which may be multiplied by a coordinate matrix representing the position of a mesh.

The calculated meshes of the target garment are only arranged at corresponding positions according to the correspondence map and are not connected to each other. Therefore, when the meshes are visualized, the surface of the target garment looks tattered. The target garment may exhibit smooth texture on the avatar surface only after displacement and additional optimization processes. Various techniques including the technique mentioned in BACKGROUND are known as techniques for deformation transfer between graphic objects based on a correspondence map and deformation transformations.

Figure 6:
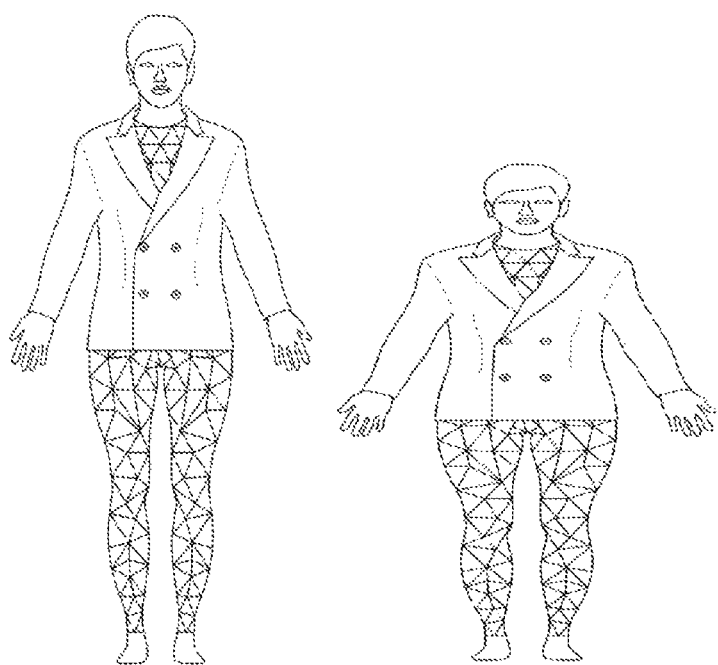
FIG. 6 shows an example of avatars each draped in a source garment and a calculated target garment.

FIG. 6 shows a source garment draped on a source avatar on the left and shows a target garment which is calculated through the above process and draped on a target avatar on the right. The present invention may also be applied to a case in which avatars significantly differ in shape or have significantly different ratios of the arms to the legs or the upper half to the lower half.

Figure 4:
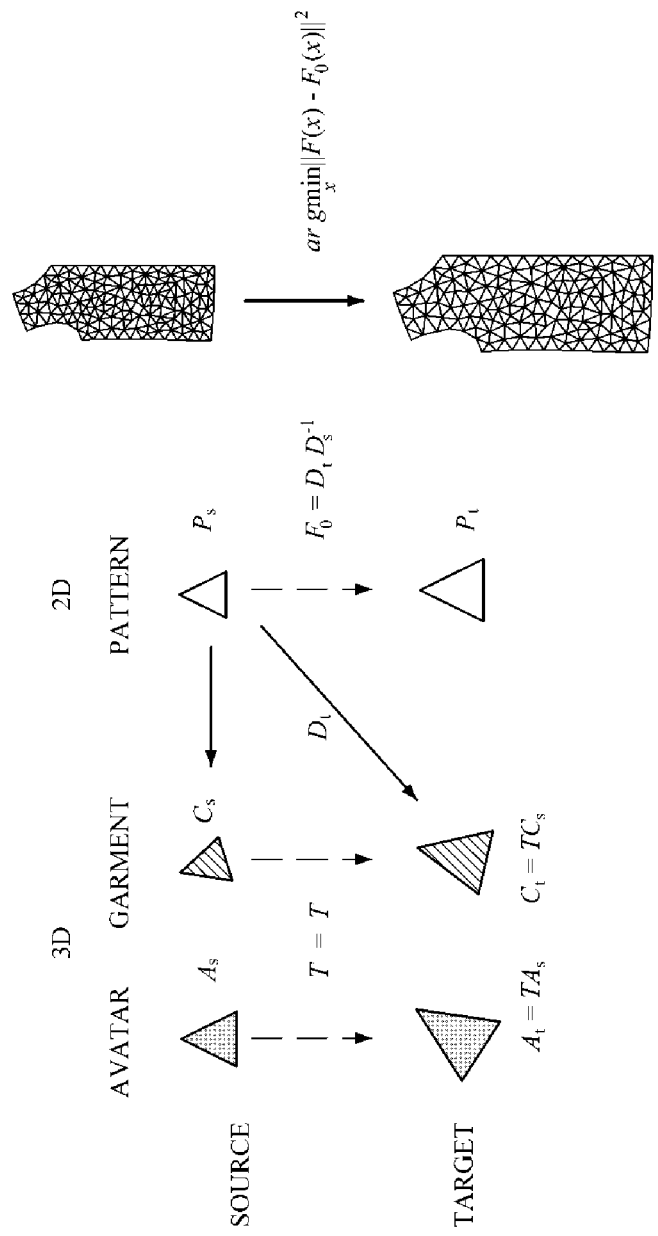
FIG. 4 illustrates a process of calculating a pattern strain tensor.

FIG. 4 illustrates a process of calculating a pattern strain tensor. As shown in FIG. 4, when meshes of a source avatar, meshes of a source garment, meshes of source patterns, meshes of a target avatar, meshes of a target garment, and meshes of target patterns are respectively, $A_s$, $C_s$, $P_s$, $A_t$, $C_t$, and $P_t$, an avatar deformation transformation is T, a source strain tensor is $D_s$, and a target strain tensor is $D_t$, $A_t = T A_s$ and $C_t = TC_s$ hold, and $C_s = D_s P_s$ and $C_t = D_t P_s$ hold. Since $C_t = D_t P_s = TC_s = TD_s P_s$, $D_t = TD_s$ and $T = D_t D_s^{-1}$ hold.

In other words, target patterns are mathematically calculated by applying an avatar deformation transformation to source patterns. However, characteristics of a 2D pattern are applied to a process of calculating a source strain tensor and a target strain tensor, and a calculated pattern strain tensor is additionally processed in a 2D pattern region. Therefore, it is possible to improve effects compared to directly applying the avatar deformation transformation.

Referring back to FIG. 1, after the garment shape conversion operation S200, source deformations are calculated (S300). According to an exemplary embodiment of the present invention, the source deformations are source strain tensors. The source strain tensors are matrices which represent deformations between the meshes $P_s$ of the source patterns and the corresponding meshes $C_s$ of the source garment draped on the source avatar in FIG. 4.

Subsequently, target deformations are calculated (S400). According to an exemplary embodiment of the present invention, the target deformations are target strain tensors. The target strain tensors are matrices which represent deformations between the meshes $P_s$ of the source patterns and the corresponding meshes $C_t$ of the target garment calculated in the garment shape conversion operation. The operation of calculating source strain tensors (S300) and the operation of calculating target strain tensors (S400) may be performed in the reverse order or concurrently.

After this, pattern deformations are generated from the source deformations and the target deformations (S500). According to an exemplary embodiment of the present invention, the pattern deformations are pattern strain tensors. According to an exemplary embodiment of the present invention, the pattern strain tensors are generated by multiplying the target strain tensor $D_t$ by an inverse matrix $D_s^{-1}$ of the source strain tensor.

Subsequently, target patterns are generated from the meshes of the source patterns and the pattern deformations (S600). According to an exemplary embodiment of the present invention, the target patterns are generated by multiplying the pattern strain tensors by the meshes of the source patterns. When all the target patterns are generated, the generated target patterns are output (S700).

Figure 3:
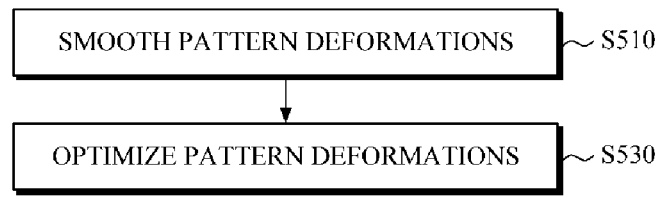
FIG. 3 is a flowchart illustrating an operation of post-processing pattern strain tensors according to an exemplary embodiment of the present invention.

According to an aspect, post processing of the pattern deformations may be included after the operation of generating pattern deformations (S500). FIG. 3 is a flowchart illustrating an operation of post-processing pattern strain tensors according to an exemplary embodiment of the present invention. As shown in the drawing, the method of generating a transferred pattern may further include an operation of smoothing the distribution of pattern deformations (S510) after the pattern deformations are generated. The operation is intended to smooth the distribution of pattern strain tensors of the meshes of the target patterns by making the pattern strain tensors similar to pattern strain tensors of the surrounding meshes. According to an exemplary embodiment of the present invention, it is possible to apply a moving average to the distribution of pattern strain tensors. According to another exemplary embodiment of the present invention, it is possible to apply low-pass filtering to the distribution. When the garment is not smoothly mapped to the avatar, for example, when one mesh of the garment is mapped to the body of the avatar and the next mesh is mapped to an arm, the contours of final output patterns are drastically distorted. This may be avoided by smoothing the pattern strain tensors.

Subsequently, a process of optimizing the pattern deformations is performed (S530). According to an exemplary embodiment of the present invention, this process is to calculate deformations of final pattern strain tensors optimized to minimize an objective function related to differences between the calculated pattern strain tensors and the final pattern strain tensors. This is a process of optimizing the pattern strain tensors generated from the source strain tensors and the target strain tensors or the pattern strain tensors smoothed thereafter by additionally deforming the pattern strain tensors or the smoothed pattern strain tensors. An objective function is calculated by accumulating residuals between final pattern strain tensors, which are final values of the additionally deformed pattern strain tensors, and input pattern strain tensors with respect to meshes of all the patterns. The objective function may be, for example, L2-norm but may be implemented into various examples. According to an exemplary embodiment of the present invention, all additional deformations of the pattern strain tensors which make a gradient of the objective function 0 are calculated. In this way, the distribution of final pattern strain tensors is calculated and stored. Since such an optimization process is well known in deformation transfer, detailed description thereof is omitted.

According to an additional aspect, a constraint may be imposed so that points of meshes on a straight line may be maintained on a straight line after optimization. Deformations of pattern strain tensors related to meshes disposed on a straight line in a source pattern are constrained so that associated vertices of the meshes may be maintained on a straight line after being multiplied by tensors.

According to an additional aspect, a constraint may be imposed so that points of meshes on a curved line may be maintained at a curvature of the curved line after optimization. Deformations of pattern strain tensors related to meshes disposed on a curved line in a source pattern are constrained so that associated vertices of the meshes may be maintained at the same curvature after being multiplied by tensors.

According to an additional aspect, a constraint may be imposed so that two segments of patterns to be connected by a sewing line may have the same length after optimization. Two segments of patterns to be connected by a sewing line are detected from the source patterns. Deformations of pattern strain tensors corresponding to the sewing line of the segments in the two patterns are constrained so that the two deformed patterns may have the same length after associated vertices of meshes are multiplied by tensors. If the segments of the two patterns to be sewed have different lengths, the garment is distorted when draped after the segments are sewed.

According to an additional aspect, a constraint may be imposed so that pressure distribution of the source garment may be maintained as identical as possible after optimization. According to an exemplary embodiment of the present invention, pressure distribution of the meshes of the source garment over the source avatar surface is calculated and stored. Subsequently, the pressure distribution of the source garment is converted into pressure distribution of the target garment using the correspondence map. The pressure of the target garment is increased in a part in which the volume of the avatar is increased and is reduced in a part in which the volume of the avatar is reduced. Subsequently, within a constraint of the pressure distribution of the target garment calculated through the conversion, final pattern strain tensors optimized to minimize an objective function related to differences between the calculated pattern strain tensors and the final pattern strain tensors are calculated.

As described above, the present invention may be applied to even a case in which meshes of a source avatar do not have the same number of vertices as meshes of a target avatar. Also, the present invention may be applied to even a case in which a source avatar does not include the same number of meshes as a target avatar or connectivity between meshes of a source avatar differs from that of a target avatar.

The present invention may provide patterns of a garment to be draped on a target avatar from a garment draped on a source avatar with the degree of completion for actual use.

Although exemplary embodiments of the present invention have been described in detail above with reference to the accompanying drawings, the present invention is not limited to the embodiments, and also it should be interpreted that the present invention covers various modifications which may be derived by those of ordinary skill in the art. The claims are intended to encompass all such modifications.

What is claimed is:

1. A method of generating a transferred pattern of a garment draped on an avatar, the method being implemented by a graphic program executed in a computing device including a microprocessor and a memory for storing a program executed by the microprocessor and data, and comprising:
    obtaining deformation transformations between meshes of a surface of a source avatar and corresponding meshes of a surface of a target avatar;
    calculating mesh shapes of a target garment to be draped on the target avatar by applying the deformation transformations of corresponding meshes of the source avatar surface to meshes of a source garment draped on the source avatar;
    calculating source deformations based on deformations between meshes of source patterns and corresponding meshes of the source garment;
    calculating target deformations based on deformations between the meshes of the source patterns and corresponding meshes of the target garment obtained from the mesh shapes of the target garment;
    generating target patterns based on the source patterns and pattern deformations, the pattern deformations being determined based on the source deformations and the target deformations; and
    outputting the generated target patterns.

2. The method of claim 1, wherein the obtaining of the deformation transformations comprises:
    obtaining a correspondence map between the source avatar and the target avatar based on pairs of pieces of position information between meshes of a first virtual reference garment draped on the source avatar and a second virtual reference garment draped on the target avatar; and
    determining the deformation transformations between the meshes of the source avatar surface and the corresponding meshes of the target avatar surface based on the correspondence map.

3. The method of claim 2, wherein the obtaining of the correspondence map comprises:
    draping the first virtual reference garment, which is modeled with meshes whose plurality of vertices are connected to each other by springs and designed to closely adhere to a body surface, on the source avatar;
    draping the second virtual reference garment on the target avatar; and
    calculating the pairs of the pieces of position information of the meshes of the first virtual reference garment draped on the source avatar and the corresponding meshes of the second virtual reference garment draped on the target avatar as the correspondence map between the source avatar and the target avatar.

4. The method of claim 2, wherein deformation between the source avatar and the target avatar is calculated as deformation transformations between meshes of the first virtual reference garment draped on the source avatar and corresponding meshes of the second virtual reference garment draped on the target avatar.

5. The method of claim 2, wherein the correspondence map includes pairs of coordinates of first reference points of meshes of the first virtual reference garment draped on the source avatar and coordinates of second reference points of corresponding meshes of the second virtual reference garment draped on the target avatar.

6. The method of claim 5, wherein the first reference points and the second reference points are vertices of the meshes.

7. The method of claim 5, wherein the first reference points and the second reference points are barycenters of the meshes.

8. The method of claim 1, wherein the generating of the target patterns comprising smoothing distribution of the pattern deformations.

9. The method of claim 1, wherein the generating of the target patterns comprising performing optimization to calculate final pattern deformations to minimize an objective function related to differences between the calculated pattern deformations and the final pattern deformations.

10. The method of claim 9, wherein a constraint is imposed so that points of meshes on a straight line are maintained on a straight line after performing the optimization.

11. The method of claim 9, wherein a constraint is imposed so that points of meshes on a curved line are maintained at a curvature of the curved line after performing the optimization.

12. The method of claim 9, wherein a constraint is imposed so that two segments of patterns to be connected by a sewing line have identical lengths after performing the optimization.

13. The method of claim 9, wherein performing the optimization comprises:
converting pressure distribution of the meshes of the source garment on the source avatar surface into pressure distribution of the meshes of the target garment on the target avatar using a correspondence map; and
calculating final pattern deformations optimized to minimize an objective function related to differences between the calculated pattern deformations and the final pattern deformations within a constraint that the pressure distribution is maintained as identical as possible after the optimization operation.

14. The method of claim 9, wherein the generating of the target patterns further comprising extracting a contour based on positions of mesh points determined by performing the optimization.

15. A non-transitory computer-readable medium storing program instructions, the instructions when executed by a processor cause the processor to:

obtain deformation transformations between meshes of a surface of a source avatar and corresponding meshes of a surface of a target avatar;

calculate mesh shapes of a target garment to be draped on the target avatar by applying the deformation transformations of corresponding meshes of the source avatar surface to meshes of a source garment draped on the source avatar;

calculate source deformations based on deformations between meshes of source patterns and corresponding meshes of the source garment;

calculate target deformations based on deformations between the meshes of the source patterns and corresponding meshes of the target garment obtained from the mesh shapes of the target garment;

generate target patterns based on the source patterns and pattern deformations, the pattern deformations being determined based on the source deformations and the target deformations; and output the generated target patterns.

* * * * *